(12) United States Patent
Cohen et al.

(10) Patent No.: US 11,341,257 B1
(45) Date of Patent: May 24, 2022

(54) QUERY INDEXING WITH PERMISSIONS INTEGRATION AND FEDERATED SEARCH

(71) Applicant: PALANTIR TECHNOLOGIES INC., Palo Alto, CA (US)

(72) Inventors: David Cohen, Los Altos, CA (US); Jeffrey Chen, Menlo Park, CA (US); Matthew Betten, Palo Alto, CA (US); Michael Kross, Palo Alto, CA (US); Robert Liu, Palo Alto, CA (US); Stephen Freiberg, Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 713 days.

(21) Appl. No.: 16/362,383

(22) Filed: Mar. 22, 2019

Related U.S. Application Data

(60) Provisional application No. 62/734,264, filed on Sep. 21, 2018.

(51) Int. Cl.
*G06F 21/62* (2013.01)
*G06F 16/25* (2019.01)
(Continued)

(52) U.S. Cl.
CPC .......... *G06F 21/6218* (2013.01); *G06F 9/542* (2013.01); *G06F 16/2471* (2019.01);
(Continued)

(58) Field of Classification Search
CPC .. G06F 21/6218; G06F 21/62; G06F 16/2471; G06F 16/256; H04L 63/101; H04L 63/104; H04L 63/10
See application file for complete search history.

(56) References Cited

U.S. PATENT DOCUMENTS

| | | | |
|---|---|---|---|
| 6,357,010 B1 * | 3/2002 | Viets | H04L 29/06 709/225 |
| 8,918,818 B2 | 12/2014 | DeWeese et al. | |

(Continued)

OTHER PUBLICATIONS

Sasu Tarkoma, "Matching Content Against Constraints—Chapter 8", In Sau Tarkoma: Publish/Subscribe Systems, dated 2012, Wiley, pp. 177-204.

(Continued)

*Primary Examiner* — Edward Zee
(74) *Attorney, Agent, or Firm* — Hickman Becker Bingham Ledesma

(57) ABSTRACT

In an embodiment, a computer-implemented method comprises receiving a plurality of identifiers of first versions of electronic documents that have been stored in a distributed data storage system and queuing the identifiers in a queue table of a database; obtaining, from the queue table, a set of the identifiers of the first versions of the electronic documents; invoking, using the set of the identifiers, a query indexing function of a search engine system and receiving a set of matching identifiers of electronic documents, from among the set of identifiers, that match queries that have been registered using the query indexing function; storing the matching identifiers in a last-processed table; processing second versions of the electronic documents associated with the matching identifiers, using the query indexing function; updating a feed associated with a user account to show messages referring to the first versions of the electronic documents in response to determining that the second versions of the electronic documents do not match the queries.

20 Claims, 8 Drawing Sheets

(51) Int. Cl.
    *G06F 16/901* (2019.01)
    *G06F 16/2458* (2019.01)
    *H04L 9/40* (2022.01)
    *G06F 16/906* (2019.01)
    *G06F 9/54* (2006.01)
    *G06F 16/93* (2019.01)
    *G06F 21/00* (2013.01)
    *H04L 29/06* (2006.01)

(52) U.S. Cl.
    CPC .......... *G06F 16/256* (2019.01); *G06F 16/906* (2019.01); *G06F 16/9017* (2019.01); *H04L 63/101* (2013.01); *H04L 63/104* (2013.01); *G06F 16/93* (2019.01)

(56) References Cited

U.S. PATENT DOCUMENTS

| | | | |
|---|---|---|---|
| 9,712,466 | B2 | 7/2017 | Cohen et al. |
| 10,250,401 | B1 | 4/2019 | Skiff et al. |
| 2007/0174399 | A1 | 7/2007 | Ogle et al. |
| 2009/0106271 | A1* | 4/2009 | Chieu .................. G06F 16/835 |
| 2011/0276903 | A1 | 11/2011 | Mehin et al. |
| 2013/0097688 | A1 | 4/2013 | Bradley, II et al. |
| 2015/0261847 | A1 | 9/2015 | Ducott, III |
| 2015/0319111 | A1 | 11/2015 | Carino et al. |
| 2015/0350251 | A1 | 12/2015 | Brander et al. |
| 2015/0358306 | A1 | 12/2015 | Adams et al. |
| 2016/0337291 | A1 | 11/2016 | Park et al. |

OTHER PUBLICATIONS

Jones, Adam, "Understanding the Elasticsearch Percolator" Medium, dated Apr. 24, 2018, pp. 1-6.
Anonymous: Percolate Query, Elasticsearch Reference 6.2, Elastic Elastic.com, dated Apr. 24, 2018, pp. 1-16.
Official Communication for European Patent Application No. 18209228.8 dated Jan. 22, 2019.

\* cited by examiner

QUERY INDEXING WITH PERMISSIONS INTEGRATION AND FEDERATED SEARCH

BENEFIT CLAIM

This application claims the benefit under 35 U.S.C. § 119 of provisional application 62/734,264, filed Sep. 21, 2018, the entire contents of which are hereby incorporated by reference as if fully set forth herein.

FIELD OF THE DISCLOSURE

One technical field of the present disclosure is computer-implemented techniques for automatically providing updated result sets that match stored search queries in response to new or changed documents in a distributed computer system. Another technical field is controlling access to electronic resources such as storage, folders, applications and documents including computer-implemented access control lists (ACLs) as applied to electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Selected digital data search systems now offer the capability to register queries, which are indexed in the search system, and then submit an identifier of a document or data object to the search system to determine whether the document or data object matches any previously registered query. An example is the Percolator facility of Elasticsearch, from Elasticsearch BV of the Netherlands. Such query indexing systems provide a solution to problems such as how to automatically generate notifications when new documents match a topic of recurring interest. For example, such query indexing systems can be used as a foundation for streaming data feed systems in which an alert is placed into a feed when a search query matches a document or structured object that is newly created or received. Typically, these systems are used to generate alerts when system log files have changed, indicating errors logged by a system, for example.

In this manner, query indexing systems like Percolator provide a means for user accounts or programs to automatically receive notification and respond to changes in data that other user accounts or programs make to data repositories of interest. While this capability is useful, it becomes more difficult to use in systems in which documents or objects change frequently. Furthermore, existing query indexing systems do not natively support systems in which it is useful for multiple different user accounts, or groups, to concurrently receive the same alerts. Further, while the service is useful to insulate programs or users from complexity involved in checking documents or objects for updates, Percolator provides no mechanism for avoiding duplicate notifications and does not implement complex access control mechanisms that are necessary in some applications. It suffers performance degradation when large numbers of objects need to be checked for updates. It does not readily integrate with federated search systems that need to integrate notifications with search results obtained via other means and does not provide means to ensure consistent views of a shared feed for multiple users.

Another issue is integration with access control systems. Past approaches to managing access control lists (ACLs) for electronic documents have involved creating a unique identifier (ID) for each ACL, then associating the IDs with account identifiers or user identifiers or using security groups. For example, obtaining access to a document could require a user identifier to be within a particular security group; similarly, if a document is marked "Class A," then the user could be associated with the Class A level of access to achieve access to that particular document. To determine whether a particular user or account is allowed to access a document, in one approach, a database query causes a computer to retrieve all documents matching a particular search query that the user has provided without regard to security or access issues. The computer then determines for each document whether the user is in one of the security groups which grants the user permission to the document according to the associated ACLs. When the search returns millions of documents or "hits", but the user might be allowed access to only a few, this approach is inefficient.

Another approach is to create mappings of security groups or classifications to ACL IDs, which are typically integers, then associate permitted policies via the integer values with documents. A search query begins by identifying a subset of all ACL IDs that are associated with a user account, then includes that subset as a query term such that the subset must intersect with ACL IDs of documents in the result set. This approach is workable if the number of distinct ACL IDs is small. However, if the total number of ACL IDs is very large, then checking an intersection with the set of ACL IDs would cause performance to suffer. Further, if changes in security policies occur frequently, then many recalculations of the query parameters may be needed.

Based on the foregoing, improvements in processing recurring queries and alerts on document changes, with good integration to permissions systems to manage security attributes of stored digital data, are needed.

SUMMARY

The appended claims may serve as a summary of the invention.

DETAILED DESCRIPTION

Figure 1:
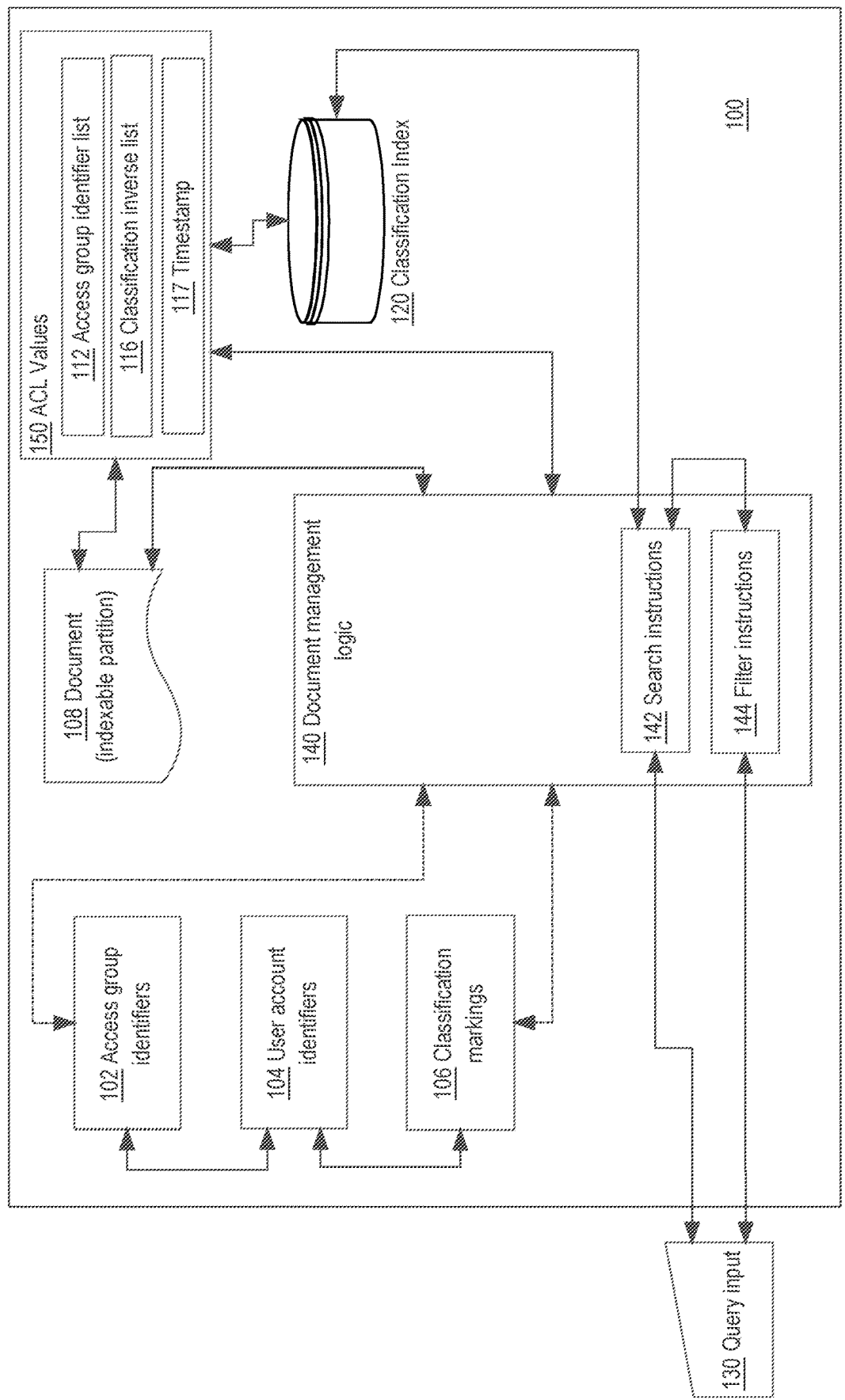
FIG. 1 illustrates an example computer system with which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In an embodiment, a computer-implemented method comprises receiving a plurality of identifiers of first versions of electronic documents that have been stored in a distributed data storage system and queuing the identifiers in a queue table of a database; obtaining, from the queue table, a set of the identifiers of the first versions of the electronic documents; invoking, using the set of the identifiers, a query indexing function of a search engine system and receiving a set of matching identifiers of electronic documents, from among the set of identifiers, that match queries that have been registered using the query indexing function; storing the matching identifiers in a last-processed table; processing second versions of the electronic documents associated with the matching identifiers, using the query indexing function; updating a feed associated with a user account to show messages referring to the first versions of the electronic documents in response to determining that the second versions of the electronic documents do not match the queries.

In one feature, the method further comprises obtaining, from the queue table, a second set of identifiers of electronic documents; determining that the second set of identifiers of electronic documents are for electronic documents originating from federated search services, and in response thereto: for the second set of identifiers, performing the invoking and storing steps; updating the feed associated with the user account to show messages referring to the second set of identifiers of electronic documents without performing the processing step.

In another feature, the method further comprises updating the feed associated with the user account to show messages referring to the first versions of the electronic documents only in response to determining that the user account is associated with user account permissions that satisfy object permissions that are associated with the first versions of the electronic documents.

In another feature, determining that the user account is associated with user account permissions that satisfy object permissions that are associated with the first versions of the electronic documents comprises: creating and storing a plurality of different access group identifiers each associated with one or more user account identifiers, and a plurality of different classification markings each representing a different access restriction for an electronic document, and associating each of the user account identifiers with one or more of the classification markings; indexing each particular electronic document among the plurality of different electronic documents in association with values of one or more of the access group identifiers and with an inverse list of values of the classification markings that apply to the particular electronic document in a classification index; for the set of matching identifiers of electronic documents, obtaining at least a first classification marking, among the plurality of classification markings, which is associated with the user account identifier; storing, in the last-processed table, matching identifiers for only electronic documents having inverse lists that do not include the first classification marking.

In another feature, the method further comprises storing, in the last-processed table, a matching identifier for a particular electronic document only when a particular user account identifier of the user account is associated with at least one access group identifier that is associated with that particular electronic document.

A further feature provides a particular electronic document having a first classification marking, and the inverse list comprising a set of all values of the one or more classification markings other than the first classification markings.

Still another feature provides for calculating an intersection of the first classification marking and the inverse lists of the electronic documents associated with the matching identifiers.

In some embodiments, each electronic document comprises a different property of a programmatic object having a plurality of properties.

In another feature, the method further comprises creating and storing a set of shared feed authorization data that identifies one or more permissions groups and one or more classification markings; in response to receiving the set of matching identifiers of electronic documents, from among the set of identifiers, that matched queries that have been registered using the query indexing function, calculating a first digital signature of the shared feed authorization data; before updating the feed associated with the user account to show messages referring to the first versions of the electronic documents, calculating a second digital signature of the shared feed authorization data; updating the feed associated with the user account to show messages referring to the first versions of the electronic documents only when the second digital signature matches the first digital signature.

In a further feature, the method comprises creating and storing a read flag table for the user account, the read flag table comprising a mapping of a plurality of read flag values to the plurality of electronic documents; updating the feed associated with the user account to show messages referring to the first versions of the electronic documents only when the read flag table for the user account specifies that the electronic documents are not yet read by the user account.

In some embodiments, the read flag values are clear when the associated electronic documents are unread by the user account and are set when the associated electronic documents are read by the user account.

In embodiments, each security policy among a plurality of security policies may comprise a set of groups and a set of classification markings. Improved security control of electronic resources is disclosed including techniques in which values of attributes of security policies are indexed directly in the form of group identifiers and classification markings, rather than using a security policy identifier that indirectly represents groups, classifications or other aspects of access controls. Search queries include the groups or classifications that are associated with a user, and only documents matching those groups or classifications are retrieved using queries that are constructed using logic that has been optimized for efficiency.

In an embodiment, rather than indexing a list of one or more security policy identifiers in association with a particular document, a computer system is programmed to represent the contents or values of security policies in indexes. For example, the group identifiers and classification markings that may be represented in a security policy are associated directly with an electronic document and indexed. A search query comprises attributes of matching documents and also lists of the group identifiers and markings of a user account, representing access privileges that have been granted to that user account. In response, query processing logic evaluates whether the groups and markings, to which a particular user has access, satisfy the security policy represented by the groups and markings of a document.

In logic to evaluate matches, lists of groups associated with a document are interpreted disjunctively, such that a user having access to any of the groups that are associated with a document will be granted access to the document. This interpretation is joined conjunctively with an interpretation of lists of classification markings, so that satisfying both interpretations is required. The lists of classification markings associated with a document are interpreted conjunctively, such that a user must have permission for all the markings of a document to access the document. Thus, when both groups and markings are associated with a document, the user must satisfy all the classification markings and one or more of the groups. In some embodiments, markings are partitioned by categories, and a user or user account must satisfy all categories. Categories can be conjunctive or disjunctive. As an example, a document may have markings M1, M2, M3, M4, where M1, M2 are in Category A which is conjunctive, and M3, M4 are in Category B which is disjunctive; in this situation, the user account must satisfy M1 and M2, as well as one of M3 or M4.

In one embodiment, a computer-implemented method comprises creating and storing a plurality of different access group identifiers each associated with one or more user account identifiers, and a plurality of different classification markings each representing a different access restriction for an electronic document, and associating each of the user account identifiers with one or more of the classification markings; indexing each particular electronic document among a plurality of different electronic documents in association with values of one or more of the access group identifiers and with an inverse list of values of the classification markings that apply to the particular electronic document in a classification index; receiving a search query that specifies one or more attributes of electronic documents; obtaining one or more first classification markings, among the plurality of classification markings, which are associated with a particular user account identifier that is associated with the search query; executing a search of the classification index based on the search query using a covering query that requires a specified minimum number of matches between the one or more first classification markings and one or more second classification markings that are associated with a particular electronic document, and adding the particular electronic document to a result set of the search only when the covering query is satisfied; providing the result set in response to the search query.

In another embodiment, a computer-implemented method comprises creating and storing a plurality of different access group identifiers each associated with one or more user account identifiers, and a plurality of different classification markings each representing a different access restriction for an electronic document, and associating each of the user account identifiers with one or more of the classification markings; indexing each particular electronic document among a plurality of different electronic documents in association with values of one or more of the access group identifiers and with an inverse list of values of the classification markings that apply to the particular electronic document in a classification index; receiving a search query that specifies one or more attributes of electronic documents; obtaining at least a first classification marking, among the plurality of classification markings, which is associated with a particular user account identifier that is associated with the search query; executing a search of the classification index based on the search query, and in response to obtaining a result set identifying electronic documents having inverse lists that do not include the first classification marking, providing the result set in response to the search query.

2. Structural and Functional Overview—Access Control

FIG. 1 illustrates an example computer system with which embodiments may be implemented. In an embodiment, the elements of FIG. 1 may be hosted using a computer system 100 including any of a desktop computer, a networked server computer system and/or one or more virtual computing instances in a datacenter or cloud computing system. Each element of FIG. 1 is computer-implemented, using digital data storage, executable instructions and a computing device such as the computer system of FIG. 5.

In an embodiment, a plurality of different access group identifiers 102, user account identifiers 104 and classification markings 106 are created and stored in digital storage and maintained on an administrative basis for reference and use in connection with large numbers of user accounts, documents and index entries, as further described. The access group identifiers 102 may comprise string, alphanumeric or other symbolic identifiers of groups of user account identifiers that all have the same access privileges. Specific values of access group identifiers 102 are arbitrary; examples are "Finance_group," "dev_tools," "Joes_group" and so forth. The user account identifiers 104 comprise numeric, string, alphanumeric or other symbolic identifiers of user accounts. Specific values of user account identifiers 104 are arbitrary and could include "jdoe," "deborah204" or others.

The classification markings 106 are labels that reflect different levels of security classification that may be applied to documents. Example labels could refer to levels of secrecy or indicate that a document is "Releasable to S" where S is an organization or entity. (The preceding sentence does not so mark this patent document.) A finite list of classification markings 106 is used. In an embodiment, each marking has a category, which may be statically configured; examples of categories include a secrecy category and a releasable-to category. Example values of markings in the secrecy category may be {Confidential, Secret, Internal}. Example values of markings in the releaseable-to category may be {Releaseable-to-A, Releaseable-to-B, Releaseable-to-C}. Each category may be conjunctive or disjunctive, as specified in metadata in a category definition.

In an embodiment, electronic document 108 is associated with a set of ACL values 150. References to "document," in this disclosure, refer broadly to any kind of dataset or partition that can be indexed and manipulated using an application program. In one embodiment, a document is equivalent to a property of a programmatic object and thus may comprise less than all of a complete object having many properties or attributes. For example, a programmatic object may represent a person having a plurality of properties each of which may be secured differently, and each such property may be termed a partition or document. In some embodiments, documents may be any of word processing documents, spreadsheets, e-mail messages, presentations or slides, program code, sets of financial data or other datasets, as well as properties of any of the preceding. In an embodiment, a data storage device, repository or system may hold any number of electronic documents 108 and a single document is shown in FIG. 1 only to illustrate a clear example.

In an embodiment, each set of ACL values 150 comprises a document-specific access group identifier list 112, a classification inverse list 116 that is indexed in a classification index 120, and a timestamp 117. The access group identifier list 112 for a document 108 comprises a stored set of group identifiers corresponding to groups that are authorized to access the document in a particular manner. Examples of group identifiers have been given above.

The classification inverse list 116 for a document 108 comprises a list of the inverse of the classification markings that actually apply to the document. For example, if classification markings 106 comprises labels {Confidential, Secret, Internal} and document 108 is classified only as "Secret", then the inverse list 116 for that document comprises {Confidential, Internal}. Some embodiments do not require an inverse list 116 and may store and index classification markings, categories and/or groups directly with documents without the use of an inverse approach.

In an embodiment, computer system 100 executes document management logic 140, which comprises one or more stored sequences of program instructions that are programmed to carry out the functions that are described in other sections of this disclosure. In general, document management logic 140 is programmed to receive query input 130 from another computer, process, terminal or system; to use search instructions 142 to formulate one or more search queries to classification index 120; to evaluate classification inverse list 116 of each document 108 that forms part of one or more result sets that are created after processing the search queries; and to use filter instructions 144 to filter the result sets for delivery to the other computer, process, terminal or system in response to the query input 130. Further details of processing functions, data flows and other aspects of these operations are discussed in other sections herein.

Certain embodiments may be implemented using the Elasticsearch open source search engine on the Lucene open source data repository, and certain terminology herein is specific to those systems. However, other embodiments may use other search and storage systems as foundation and implement functionally equivalent logic or processes using additional program instructions.

Figure 4:
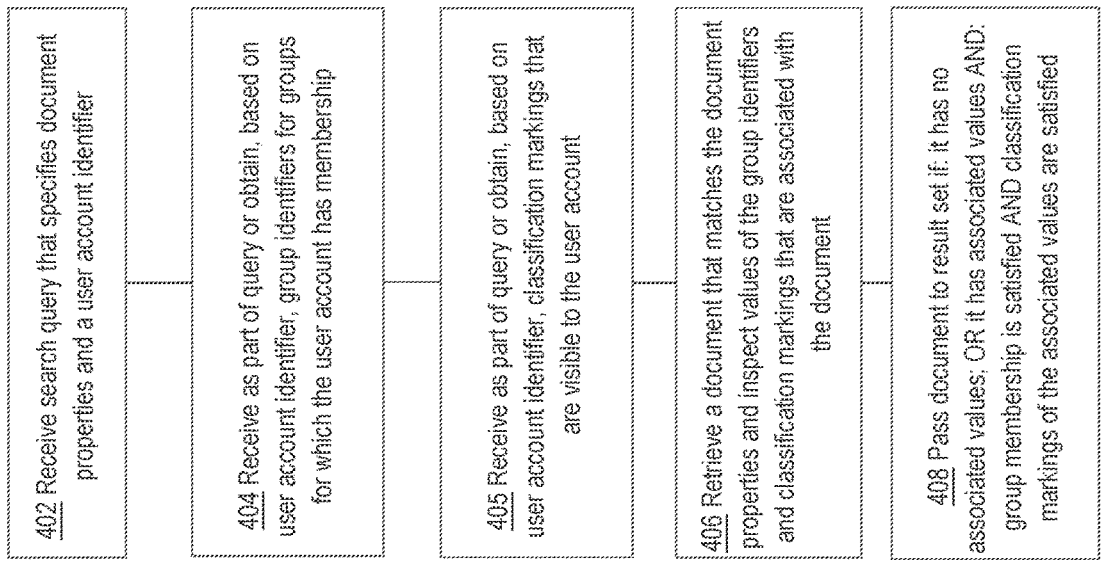
FIG. 4 illustrates an example processing flow that may be used to process search queries in embodiments.

FIG. 4 illustrates an example processing flow that may be used to process search queries in embodiments.

At step 402, a search query is received that specifies document properties and a user account identifier. Step 402 may execute in a variety of contexts, in response to receiving a programmatic call that passes a query that is effectively fully embedded into or integrated with a federated set of applications, and/or as part of an interactive online search system. Regardless of the execution context, step 402 involves receiving a query that identifies a user account and specifies attributes or properties of documents that would match the query. The other steps of the flow of FIG. 4 are arranged to automatically refine or modify the query to constrain the query to security and classification attributes that will yield documents in a result set that the user account is permitted to access or view.

At step 404, the process receives as part of the query of step 402, or obtains based on the user account identifier, a list of group identifiers for groups for which the user account has membership. Similarly, at step 405, the process receives or obtains a list of classification markings that are visible to the user account. These lists may be obtained directly from the query of step 402 or, based on the user account identifier, retrieved via queries to a separate database or repository of credentials that are associated with user accounts.

At step 406, the process retrieves a document that matches the document properties and upon retrieval inspects values of the group identifiers and classification markings that are associated with the document. This is a candidate document for which further filtering is necessary to determine if the user account is privileged to access it.

Therefore, at step 408, a filter step is executed in which the document is passed to a result set if: there are no group identifiers or classification markings associated with it, such that ACL values 150 is null, for example; or if a set of ACL values is present, and both group membership are satisfied, and classification of the associated values is satisfied. In some embodiments, all classification markings are separately indexed. In part, step 408 may comprise computing an intersection of the categories and markings that a user account has, as compared to those of the document. If the intersection is not null, then the document passes the filter, otherwise the document does not match. This approach is effective if every category is interpreted disjunctively, but for conjunctive categories, computing an intersection is inadequate and added logic is implemented.

In one embodiment, when a category is conjunctive, a programmatic definition of the classification marking category further comprises lists of category groups as positive lists and negative lists as shown in the code excerpt of TABLE 1.

TABLE 1

CATEGORY GROUP DEFINITIONS

```
{
    "properties": {
        ElasticsearchConstants.POSITIVE_PREFIX: {
            "type":"object",
            "dynamic":true
        }
        ElasticsearchConstants.NEGATIVE_PREFIX: {
            "type":"object",
            "dynamic":true
        }
    }
}
``` where each entry in POSITIVE_PREFIX and NEGATIVE_PREFIX could be in the form: 3:[1,7,10,15] where "3" is the identifier of the category and the array specifies the group identifiers that must match (for positive) or must not match (for negative).

The specific values of categories of markings, or groups, are not critical as the logic disclosed herein depends more on whether groups or markings are interpreted disjunctively or conjunctively.

In an embodiment, filter instructions 144 may be programmed to execute the foregoing logical rules as:

1. Group membership is satisfied. The group labels that are associated with the document are obtained from the document index, and an intersection of those labels is calculated with the list of the group labels associated with the user account. If the intersection is not null, then the document passes the filter; otherwise there is no match.

2. For each conjunctive classification marking category that is present, a user account satisfying all the markings of a document in that category is required to grant the user account access to the document. In one implementation, filter instructions 144 are programmed to generate a query based on the following. First, markings for a conjunctive category in the document's ACL value cannot be in the user account's negative marking set. These are markings that the user account does not have, and therefore, if markings for a conjunctive category in the document's ACL value are in the negative set, they fail to satisfy that category. Second, the document may not have any marking that is unknown. An unknown marking has a timestamp that is greater than the maximum marking timestamp on the user account's ACL value filter. Therefore, if a user account adds a marking to a conjunctive category and indexes a document with that ACL value, then the ACL value filter is out-of-date; therefore, the instructions are programmed to filter out those documents.

3. For every disjunctive classification marking category that is present, a user account satisfying at least one of the markings of a document in that category is required to grant the user account access to the document. In one implementation, filter instructions 144 are programmed to generate a query based on the following. First, either the document has no markings for this category in its ACL value, or some marking in the document's ACL value is in the user account's positive marking set.

Furthermore, in some embodiments, to address conjunctive categories of markings, either of two search strategies may be used. In a first search strategy, a search query is inverted to negate the set of markings on the ACL value filter for the user account. For example, assume that A is the set of conjunctive markings securing the document, B is the set of markings to which the user account has access, and C is the set of markings to which the user account does not have access. The query is formed such that nothing in A is in C and nothing in A is in neither B nor C. The latter part of the query can rely on the maximum marking timestamp. With this approach, a query may provide the markings that are associated with a user, and in response, the system may compute an intersection of the search query and the document markings, and if there is a match, access is denied. Thus, if a particular user account is associated with "Secret" and an intersection computation determines that document D has a match, then access is denied because the actual document marking is NOT "Secret".

Figure 2:
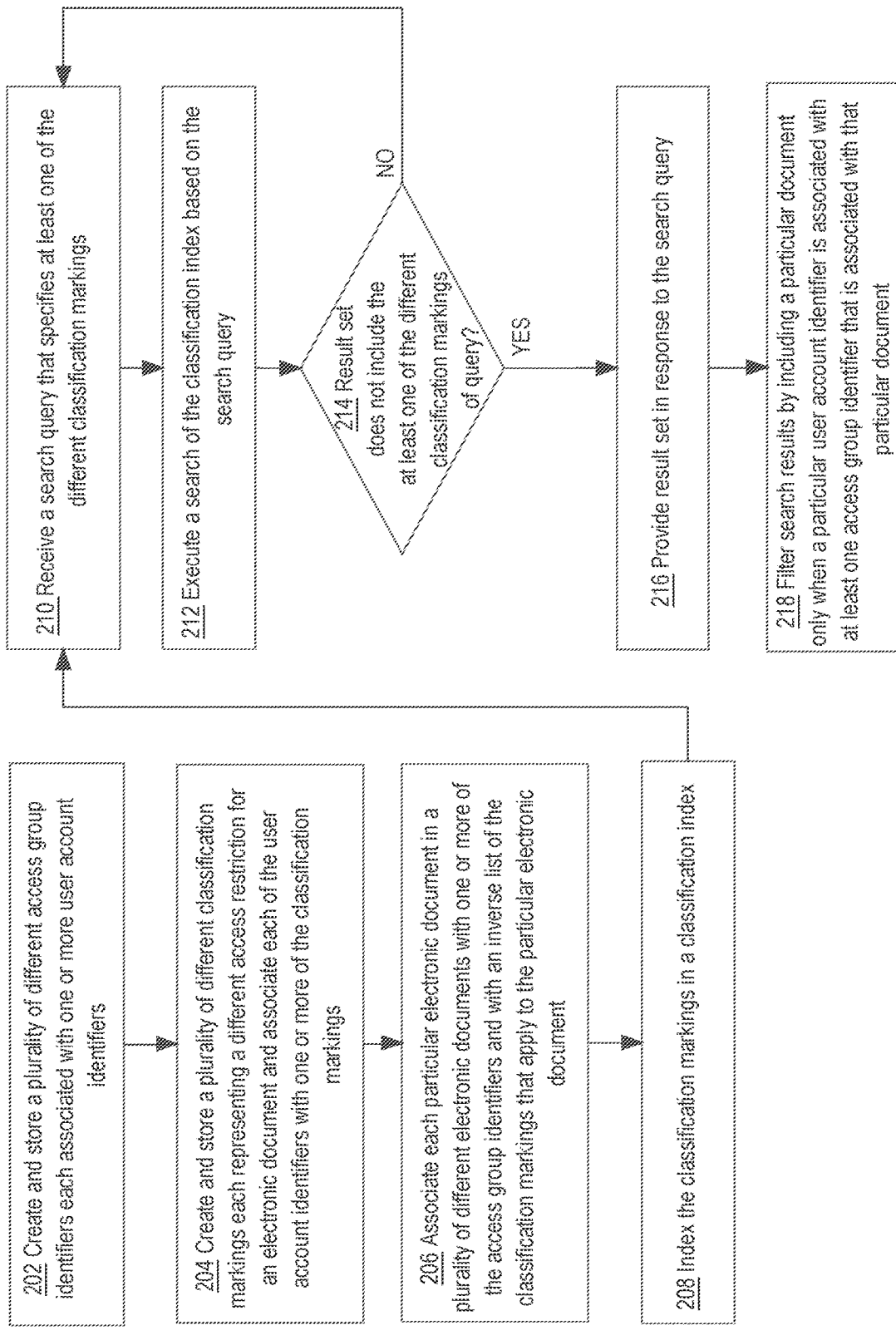
FIG. 2 illustrates a first example of a computer-implemented method of associating access group identifiers and classification markings with documents, and searching the documents based on the markings.

FIG. 2 illustrates a first example of a computer-implemented method of associating access group identifiers and classification markings with documents, and searching the documents based on the markings according to a first search strategy. FIG. 2 may be implemented, for example, in program instructions by a combination of search instructions 142 and filter instructions 144.

In an embodiment, in a computer-implemented method, step 202 comprises creating and storing a plurality of different access group identifiers each associated with one or more user account identifiers. Step 202 can comprise creating and storing statically defined access group identifiers 102 of FIG. 1.

At step 204, the process creates and stores a plurality of different classification markings each representing a different access restriction for an electronic document. Each of the user account identifiers is associated with one or more of the classification markings. These steps may be executed asynchronously at any time. As an example, step 204 can comprise creating and storing static definitions of user account identifiers 104 and classification markings 106 as seen in FIG. 1.

At step 206, the process associates each particular electronic document in a plurality of different electronic documents with one or more of the access group identifiers and with an inverse list of the classification markings that apply to the particular electronic document. At step 208, the process indexes or causes indexing the classification markings in a classification index. Steps 206, 206 may comprise both indexing document 108 of FIG. 1 and associating it with a set of ACL values 150 comprising an access group identifier list 112, classification inverse list 116 and optionally timestamp 117, which are also indexed.

At step 210, the process receives a search query that specifies at least one of the different classification markings. Step 210 may comprise receiving a programmatic call, method or function invocation from another process, program or system and/or receiving a query via user input in a user interface as part of an interactive search-response system.

At step 212, the process executes a search of the classification index based on the search query. In some embodiments, step 212 causes creating and storing a result set of identifiers of documents that match the search query based on document attributes.

At step 214, the process tests whether a result set does not include the at least one of the different classification markings specified in the query. Step 214 may comprise computing an intersection and testing for a non-null result of the intersection computation, as previously described. If step 214 yields TRUE or YES, then at step 216, the result set is provided in response to the search query. Otherwise, results are not provided, and the process may return control to step 210 to await another query, or return control to a calling process, if applicable.

At step 218, the process filters the search results by including a particular document only when a particular user account identifier is associated with at least one access group identifier that is associated with that particular document. Step 218 represents checking whether the group identifiers associated with a user account match at least one group identifier of the document; an intersection calculation may be used to yield the result. Step 218 may be executed after step 212 in some embodiments, rather than after steps 214, 216.

In a second search strategy, markings are indexed directly, and a covering query is used in which N matches are required where N markings are indexed for a particular document and N varies per document. The use of covering queries permits implementing search logic with intersection computations that result in a certain number of required matches.

Figure 3:
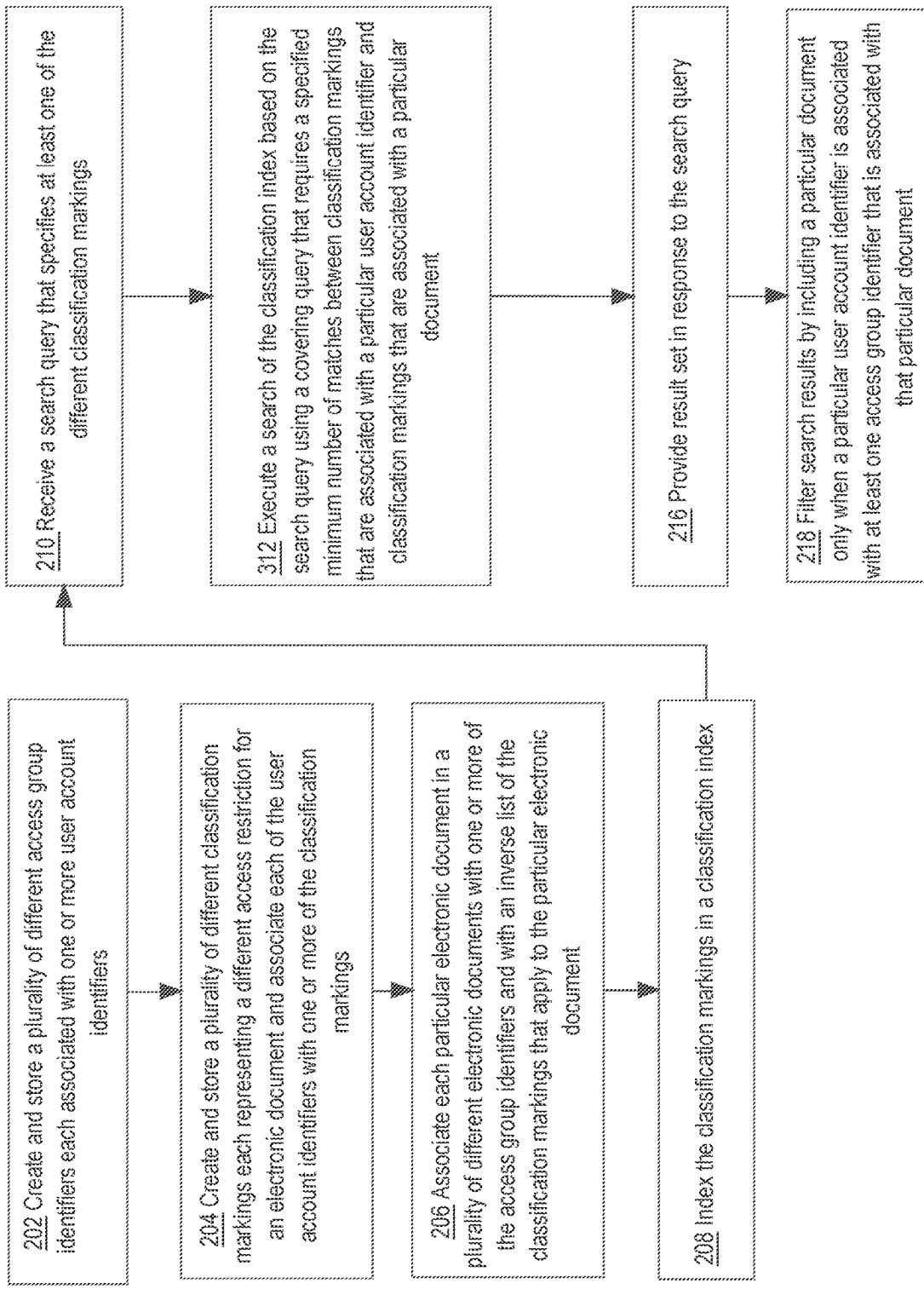
FIG. 3 illustrates a second example of a computer-implemented method of associating access group identifiers and classification markings with documents, and searching the documents based on the markings.

FIG. 3 illustrates a second example of a computer-implemented method of associating access group identifiers and classification markings with documents, and searching the documents based on the markings.

In the example of FIG. 3, steps 202, 204, 206, 208, 210 are the same as in FIG. 2 and include creating and storing a plurality of different access group identifiers each associated with one or more user account identifiers; creating and storing a plurality of different classification markings each representing a different access restriction for an electronic document, and associating each of the user account identifiers with one or more of the classification markings; associating each particular electronic document in a plurality of different electronic documents with a list of the classification markings that apply to the particular electronic document and indexing the classification markings in a classification index; and receiving a search query that specifies at least one of the different classification markings.

At step 312, the method is programmed for executing a search of the classification index based on the search query using a covering query. The covering query expresses a requirement for a specified minimum number of matches between classification markings that are associated with a particular user account identifier and classification markings that are associated with a particular document, in the manner that has been described in previous paragraphs. Thus, if N markings have been indexed for a document, then a covering query will return the document in a result set if the user account is associated with N markings also—that is, when all of N markings match. In embodiments that use Elasticsearch, covering queries are implemented as a "term set query." Different covering queries may dynamically specify to use the number of markings that have been indexed for any particular document otherwise found in the search, which will be N for that document, as the matching constraint for a particular covering query. Thus, the covering query approach may comprise executing a plurality of separate queries with a requirement to match a specified minimum number of those separate queries, in which the number may dynamically vary and is specified by a referenced field value.

Thus, as the query executes, different documents under consideration will cause evaluation of different numbers of indexed values for the different documents. Consequently, the search logic comprises a computation both of an intersection of group labels based on a plurality of terms queries, and an intersection of classification markings, the latter using a covering query. The result effectively comprises execution of an intersection of a covering query over term queries and a plurality of terms queries, in implementations using Elasticsearch and Lucene.

In some cases, elements of these searches may be combined into one combination query for purposes of execution efficiency. For example, if there are multiple categories of classification markings that each operate conjunctively, the categories can be combined in a single conjunctive query. Thus, a user with M markings and N groups, the M markings will contribute M term queries, one for each marking, and the N groups contribute one (1) terms query. The result of this simplification approach is a covering query over a plurality of terms queries and a plurality of term queries.

The result of step 312 is a digitally stored result set having zero or more result items. At step 216, the result set is provided in response to the search query.

At step 218, as in FIG. 2, the process is programmed for filtering the search results by including a particular document only when a particular user account identifier is associated with at least one access group identifier that is associated with that particular document.

In some embodiments, marking timestamp values may be associated with markings and the timestamps are increased whenever a new marking is added to a document; furthermore, current timestamps may be indexed at the time that a document is indexed. Consequently, search queries can determine when the markings of a document are outdated based on comparing a logical timestamp that is independent of system clock time to the timestamp.

Embodiments offer a number of benefits over past approaches. For example, in the present approaches, the size of a query is proportional to the number of groups and markings that exist rather than the number of policy identifiers that exist; in many systems the difference will be several orders of magnitude smaller, thereby substantially reducing use of CPU cycles, network messages, volatile memory storage and non-volatile storage. Where the number of security policies is in the millions, the number of groups is in the thousands and the number of markings is in the hundreds or less, the present approaches offer significantly more efficient processing and therefore faster return of search results.

Figure 6:
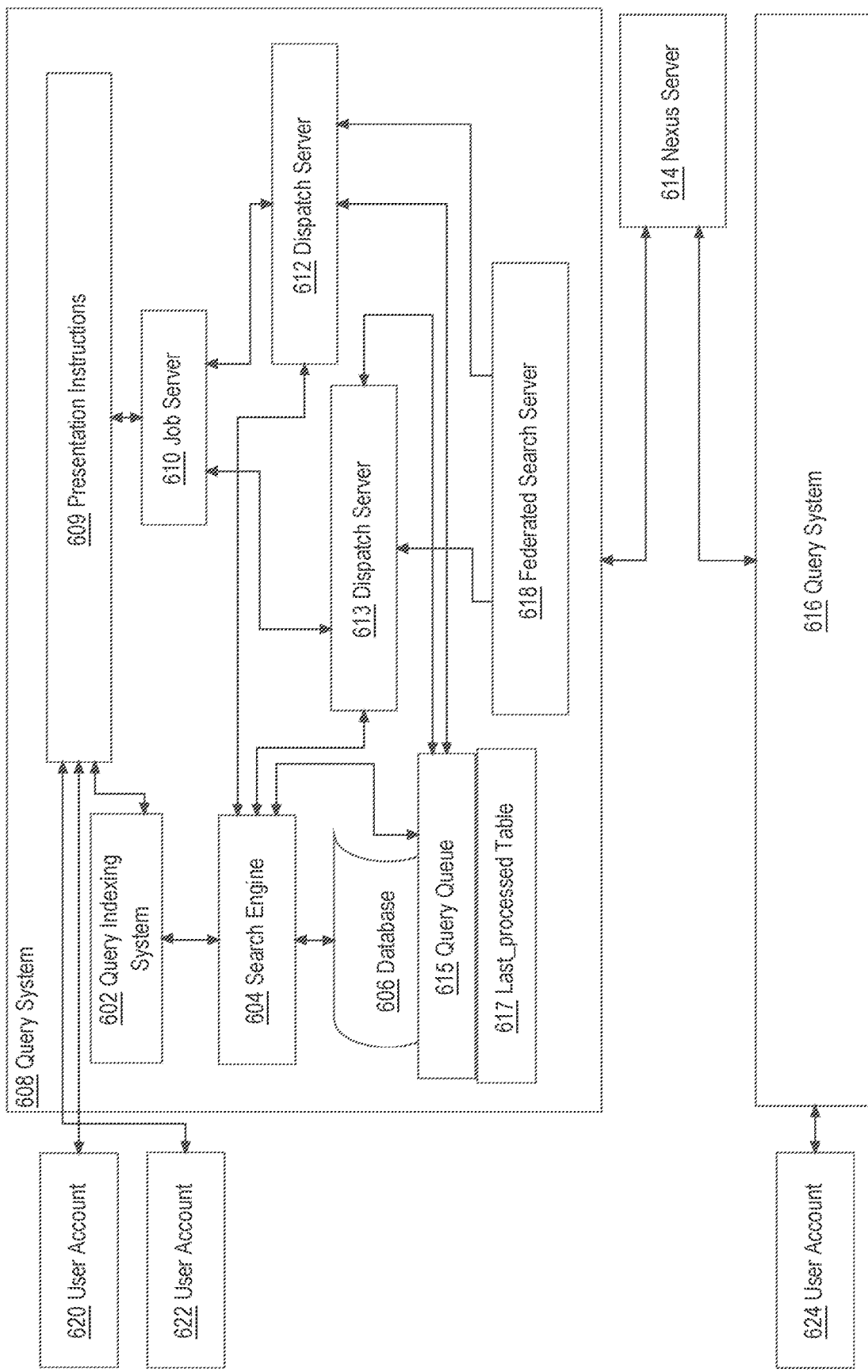
FIG. 6 illustrates a computer system that may be used to implement a query indexing system with permissions processing and shared feed capability.

3. Structural and Functional Overview—Query Indexing System 3.1 Structural Overview of Query Indexing System FIG. 6 illustrates a computer system that may be used to implement a query indexing system with permissions processing and shared feed capability. In the example of FIG. 6, a first query system 608 is communicatively coupled via one or more networks to a nexus server 614 that is shared with a second query system 616. Nexus server 614 provides data storage and search functions and acts as one unit of a federated search system that also includes query systems 608, 616. The use of a nexus server in shared search services of a distributed computer system is the subject of other disclosures such as US Pat. Pub. 20150261847 and U.S. Pat. No. 8,838,538 and therefore the reader is presumed to understand the query system and use of nexus servers in distributed systems for purposes of federated search.

In an embodiment, user accounts 620, 622 are communicatively coupled to query system 608 and user account 624 is coupled to query system 616. Each of the user accounts 620, 622, 624 may be associated with a particular individual user and with a distinct computing device at a particular time.

Each query system 608, 616 may comprise the functional elements that are shown in detail for the first query system 608 as an example. In an embodiment, a query indexing system 602 is coupled to a search engine 604 that has access to a database 606. The query indexing system 602 comprises a set of executable program instructions and/or other software elements that implement registration of search queries for electronic documents or objects, determining whether documents or objects match the queries and outputting notifications or alerts when matches are found. Search engine 604 comprises a set of executable program instructions and/or other software elements that implement more generalized search functions. Database 606 comprises digitally stored electronic objects, documents and/or messages, and metadata for them. In some embodiments, search engine 604 comprises the ELASTICSEARCH system and query indexing system 602 comprises the PERCOLATOR feature of Elasticsearch. However, other embodiments may use other programs, instruction sets or systems to implement processes that are functionally equivalent to those described herein.

Query indexing system 602 is coupled to presentation instructions 609, which comprise a set of executable program instructions and/or other software elements that implement user interface functions such as rendering feeds of matching objects or documents and delivery of feeds to user accounts 620, 622, command processing and other interaction with the user accounts. In some embodiments, presentation instructions 609 may implement an application programming interface, directly callable programmatic methods or other programmatic means of interacting with other computers, software or systems.

Presentation instructions 609 are coupled to a job server 610 that is coupled to a plurality of dispatch servers. In FIG. 6, two example dispatch servers 612, 613 are shown to illustrate a clear example but other embodiments may use any number of dispatch servers depending on desired load, throughput or other performance factors. In an embodiment, job server 610 comprises a set of executable program instructions and/or other software elements that implement scheduling functions to control the initiation of operations via the dispatch servers 612, 613 such as indexing queries in the query indexing system, transmitting identifiers of objects or documents to determine if matches occur, and so forth. Each of the dispatch servers 612, 613 comprises a set of executable program instructions and/or other software elements that implement the foregoing functions and others as further described herein.

3.2 Functional Overview of Query Indexing System

Figure 7:
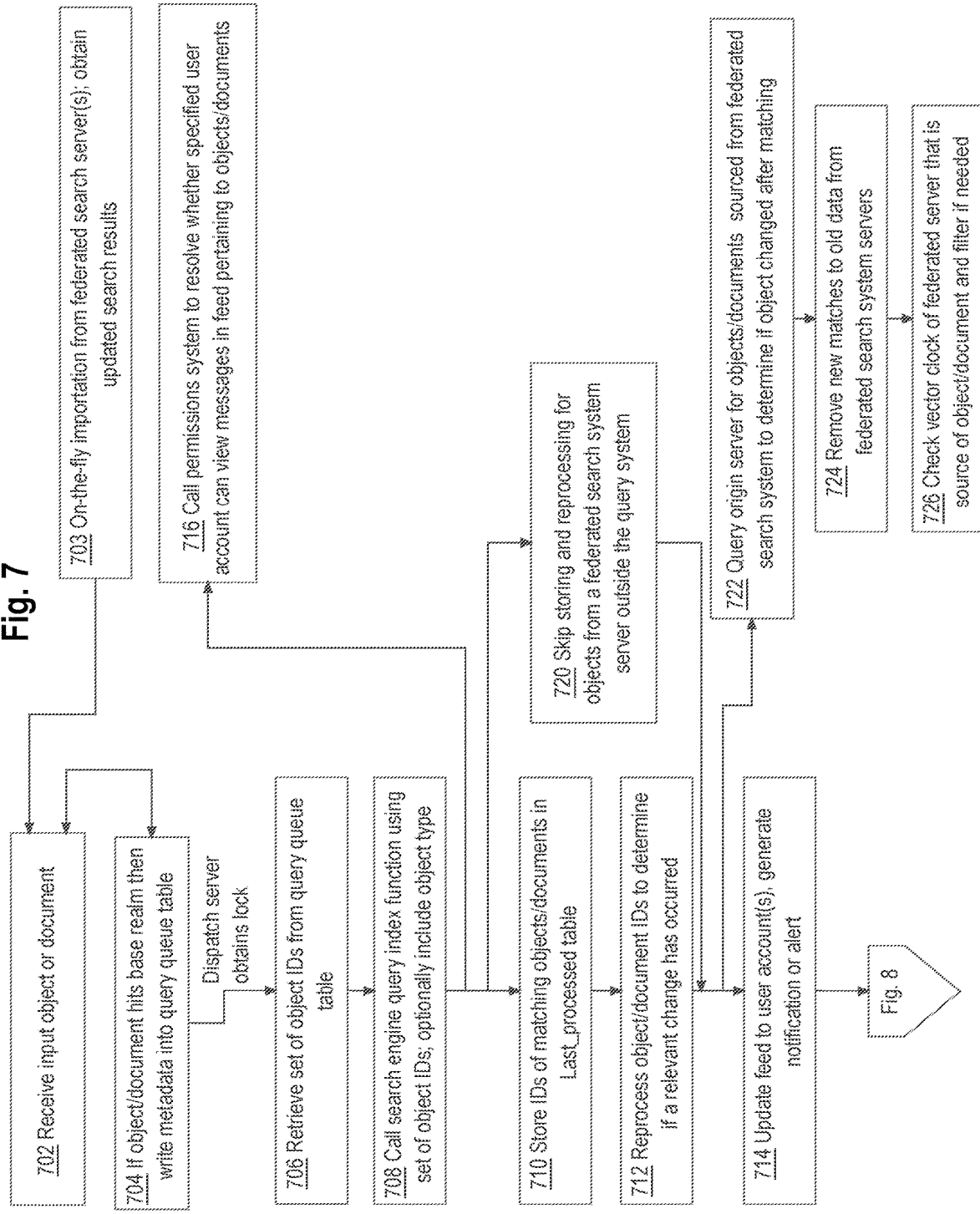
FIG. 7 is a flow diagram illustrating a method of integrating a query indexing system with queue management functions that support deduplication of results.

In various embodiments, query indexing and alert processing systems are improved in the ways now described in separate sections. FIG. 7 is a flow diagram illustrating a method of integrating a query indexing system with queue management functions that support deduplication of results. While FIG. 7 is shown as a process diagram, in practice different parts of FIG. 7 may execute non-sequentially or asynchronously and thus a strict top-to-bottom process flow is not required.

3.2.1 Queue Management for Query Indexing

In an embodiment, dispatch servers 612, 613 achieve performance improvement over prior approaches of using a query indexing system using a query queue 615 in conjunction with program logic that prevents transmitting queries to query indexing system 602 for objects that are known to be unchanged. In an embodiment, each of the dispatch servers may query and update a tracking table that stores identifiers to signal whether changes in objects have occurred. Using a background process, documents or objects in the query queue are checked by submitting them to query indexing system 602 and detecting matches. Furthermore, in some embodiments pre-processing logic of the dispatch servers 612, 613 is programmed to detect when a change to an object cannot result in a match to a registered query and not to generate an alert in that case.

In some embodiments, a document or object is specified by user account 620, 622 or received via programmatic means, as seen in step 702 of FIG. 7. In some embodiments, step 702 is executed in response to storing a new version of an object. The document or object is tested to determine whether it is associated with the base realm of the query system 608. If so, the document or object is written into query queue table 615 of database 606, as indicated by step 704. Each record in query queue table 615 has an object ID and enough info to identify an object in search engine 604 such as object ID, realm ID, date of indexing, versioning, security timestamp, object type.

In some embodiments, the dispatch servers 612, 613 compete to hold a lock so that only one dispatch server is capable of executing the operations of query indexing system 602 at a time. For a particular dispatch server 612, in response to successfully obtaining the lock, as seen at step 706, the particular dispatch server retrieves a set of object identifiers from the query queue table 615. In some embodiments, the set of object identifiers is tested to determine if it contains multiple versions of the same object; if so, then only the latest version of the object is used, and the other versions are ignored for purposes of later steps.

The dispatch server 612 then calls search engine 604 using a command to match objects indicated by the object identifiers against registered queries, as seen at step 708. When the query indexing system 602 is Percolate, a multi-Percolate or mPercolate command may be used, passing the set of object identifiers.

Step 708 indicates that optionally an object type value may be included in the call. In some embodiments that integrate with Elasticsearch version 6, the object type may be a parameter in the mPercolate call, which will cause filtering a result set to include only documents or objects that match the specified object type. In some embodiments, the dispatch server 612 is programmed to issue multi-Percolate calls only for queries that are capable of matching an object identifier based on its type. This programmatic test adds efficiency to the system by invoking query indexing system 602 only for a query that is structured to possibly return matching results based on object type, and not calling query indexing system 602 for queries that can only return documents with non-matching object types.

Step 708 will result in the search engine query index function returning a result set of objects or documents. For documents that match, object identifiers are stored in a Last_processed table 617, the purpose of which is to store data indicating when an object was last processed, as seen at step 710. In an embodiment, the Last_processed table tracks, for each object identifier, the last version of that object that was processed using the query index function.

Accordingly, as indicated by step 712, for all objects that match, an identifier for the last version of the same object that was previously processed is obtained from the Last_processed table 617 and submitted to the query indexing system 602 again. If another match occurs, then the original match of that object identifier may be ignored, because no relevant change has occurred since the object was last processed. However, in cases in which a match has occurred now but there is no entry in the Last_processed table 617, the present match is a "hit" and the object identifier is added to a result set or "hits" list that is digitally stored in memory. With this approach, a result set, hit list or feed will only include documents for which a registered query matches the current version but not the last version.

At step 714, in response to adding an object identifier to the result set, the dispatch server 612 may be programmed to update a feed associated with one or more of the user accounts 620, 622, cause a notification via presentation instructions 609, transmitting an alert message or other action depending on notification settings that are stored for the associated user account.

Unlike prior approaches of using query index systems, the present approach improves efficiency by dispatching requests to match documents or objects to registered queries using a single submission of multiple object identifiers. Furthermore, updates to a feed, notifications or alerts are not generated when a match occurs, but no material update has occurred in an object since the last time that a match occurred. Consequently, immaterial updates to objects can be ignored and feeds can be deduplicated, removing duplicate matching objects. Therefore, the disclosed approaches result in less use of CPU, memory and storage resources as well as less network bandwidth that would otherwise be needed to transmit unnecessary messages or programmatic calls.

3.2.2 Permissions Management for Query Indexing

In an embodiment, permissions logic based on indexing values of permissions groups and classification markings, rather than ACL identifiers, using the mechanisms and search strategies described in section 2 of this disclosure, is applied to re-index queries when security policies or permissions change, and to filter out queries that cannot produce result sets that a user is permitted to access.

In an embodiment, to determine whether a user account can view or access a particular object, each query indexed in query indexing system 602 is stored in association with values, or references, to the permissions held by a particular user account 620, 622 that created the query, at the time that the query was created. Therefore, in an embodiment, an independent process implemented for example as a background job of dispatch servers 612, 613, periodically tests whether permissions associated with user accounts 620, 622 have changed, and if so, each query that has been registered in the query indexing system 602 for that user account is reindexed to capture the updated permissions values.

Referring again to FIG. 7, with this approach, at step 716 a call to the permissions system of section 2 can be executed when a hit is identified to determine whether a user account 620, 622 has permission to view or access the hit. Or, in an embodiment, each result set is loaded from within an investigational view that is subject to permissions control. Therefore, loading the result set causes applying the permissions using the model of section 2 to determine whether a particular result can be viewed in the current investigation.

In an embodiment, each query is stored in search engine 604 as an object or document. For example, a query may be stored in Elasticsearch in the form of a document. In an embodiment, each query is indexed in search engine 604 using a dedicated index that is independent of any index used for other data in the search system. A separate index is used for queries to permit the use of different sharding and replication settings or policies than those that are used for other data.

3.2.3 Deduplication Filtering in Feeds

In an embodiment, as shown at step 718, object identifiers in result sets are processed for deduplication before delivery to the feed that is associated with a user account, to avoid providing feeds in which duplicate objects appear. For example, a feed may be defined in database 906 by metadata including a list of object identifiers representing objects that should appear in displays of the feed; when a result set is processed, the list is searched and any object identifier already appearing in the list is not duplicated.

In some embodiments, deduplication first uses a table stored in database 606 that tracks the (feed identifier, object identifier) pairs that have been returned as results. This table is used to filter out all results returned from search engine 604 that have been seen already.

In some embodiments, deduplication is applied only if a deduplication flag value is stored in metadata that defines a feed in database 606; thus, some feeds may include duplicate objects. For example, entry feeds or exit feeds may be implemented using dispatch servers 612, 613, in which documents matching a query are those having metadata indicating entry into or exit from a physical or geographic region. Thus, an object may represent a person or vehicle, and a query may specify that an object matches if it enters and/or exits a geographic region that is defined in metadata of the query. In such a case, a feed may include duplicates of objects when multiple matches indicate that the object is repeatedly entering and/or exiting the geographic region.

Exit feeds implemented in this manner offer a distinct advantage over ordinary query index system feeds or queries because they will not include objects that are outside a geographic region of interest but undergone a change of type or attribute that otherwise would have matched a query. For example, assume that an analyst is interested in receiving alerts when a semi-trailer truck that has exited a transportation hub. If an object representing a truck located distant from and irrelevant to the transportation hub, is updated to specify that the object represents a semi-trailer truck, an ordinary query might match that object since it is a semi-trailer truck that is outside the transportation hub. However, that object does not represent a vehicle that has exited the transportation hub of interest. By programming logic to process an exit query in the manner described above, the object representing the changed vehicle is excluded, and only objects that were previously identified as semi-trailer truck and that have moved from within the transportation hub to outside the transportation hub are included in the feed.

3.2.4 Integration of Query Indexing System Feeds with Federated Search System

In an embodiment, automatic integration with a federated search system can provide feeds to search systems for indexing; using background processes to transmit updated feeds to the search systems when they restart; automatically submitting search queries to the federated search system and integrating search results with a feed of updates from query indexing system 602; and detecting object changes in the sources that the federated search checks, and submitting queries for those objects to the query indexing system.

In some embodiments, query indexing system 602 with search engine 604 may be integrated into a federated search system in which each query system 608, 616 separately implements a federated search server 618 as well as a different instance of query indexing system 602, search engine 604 and database 606, with or without a nexus server 614 representing a shared search service. Preferably, the existence and use of a federated search system to supply some or all of the objects or documents in a feed are not readily apparent to user accounts 620, 622, which simply receive a feed of documents in which different documents may come from different storage or search systems including those of query system 608, nexus 614 and/or query system 616. Thus, query indexing integrated with federated search provides a feed that places objects into search results from different sources in a manner that is transparent to the user accounts 620, 622, allowing rich feeds that contain messages for objects or documents that appear to have been locally sourced but actually are stored in many widely distributed systems.

In an embodiment, in each query system data moves from a federated search server 618 to a dispatch server 612, 613 in a process termed on-the-fly importing, as seen at step 703 (FIG. 7); in this approach, when a matching search result appears in federated search server 618, it is copied to the search engine 604 and/or dispatch servers without material delay. Furthermore, in an embodiment, dispatch servers 612, 613 are programmed to apply special processing to objects that are subject to updates or modification at the time of importation or entry to a feed. An update to an object at a particular federated search server 618 acting as origin server for that object does not require special processing. If an object is on-the-fly imported to a feed, and the object is subsequently edited at the origin server, the origin server is programmed to push the updated object to the dispatch server 612, 613 for entry into the feed.

In an embodiment, definitions of feeds, which are associated with queries that can include objects from federated search servers 618, 614, are transmitted by dispatch servers 612, 613 from database 604 to the origin federated search server for those objects, for indexing at the federated search server in an independent search cluster. For example, each federated search server 618, 614 may be programmed to index objects in its own search engine 604 cluster. As a result, all origin servers for objects that participated in a federated search system will acquire copies of queries that implicate those servers.

In an embodiment, a dedicated process enables all the federated search servers 618, 614 to receive up-to-date versions of a feed, for example, when a particular federated search server restarts, as also indicated at step 703. For example, an update process may be programmed to query each federated search server for each feed including a version value associated with each feed, and to track which federated search servers have transmitted back an acknowledgment of receiving the particular version of the feed. In response to detecting an anomaly such as no acknowledgment of a version or acknowledgment of an obsolete version, an updated definition of a feed may be transmitted to the federated search server that has the anomaly.

In an embodiment, as seen at step 720 (FIG. 7), the query indexing system is programmed to determine that if a query generates a hit for an object for which the origin server is in the federated search system, that hit automatically is entered into a result set or feed for a current user account, and there is no need to use the Last_processed table to detect whether a change has occurred.

However, the origin server is authoritative for the document representing a hit, and the document could be edited independently at the origin server between the time that a hit is formed and a slightly later time that the hit appears in a feed; therefore, in an embodiment, the dispatch server is programmed to query the origin server just before entering a hit into the feed, to test whether a recent update occurred, and whether one or more updated attributes have changed whether the hit matches the query. Step 722 represents this test. If this test indicates that the hit is no longer a match, then it may be omitted from the feed. In an embodiment, each dispatch server is programmed to detect whether the version of an object that is received from an origin server in the federated search system is different than a version that matched at the time of operation of query indexing system 602. For example, execution of the query index system using a federated search system server may result in a hit for a particular object; then an edit to that object may occur in the federated search system; then the new version of the edited object may arrive at the dispatch server. In this case, the dispatch server is programmed to query the federated search system to verify that the version number remains current and, in response to an error, to re-perform the query index operation to determine if the object still matches. This approach ensures that the feed to a user account reflects the current version of a matching object.

In an embodiment, new matches to old data may be omitted from a feed, as noted at step 724. For example, data at an origin server of the federated search system may never be on-the-fly imported to a dispatch server and may not match all registered queries for an extended period of time. If a newly registered query matches old data, then the dispatch server may be programmed to omit a hit associated with such old data from the feed. The definition of "old" data may vary in different embodiments; in one embodiment, old data is data that was created more than one week ago. In one implementation, such old data that is on-the-fly imported to a dispatch server will skip the query indexing system queue described earlier and is directly inserted into the Last_processed table. With this approach, if the old data is edited again, it will be treated like any other object that already existed because it has been conceptually refreshed and is now more relevant to the feed.

In an embodiment, the query indexing system 602 described herein is implemented at each server of the federated search system. Furthermore, each dispatch server 612, 613 is programmed with polling logic to query the servers in the federated search system to request any new hits that the query index systems at those federated search system servers have identified recently. In an embodiment, a job server is programmed to request the dispatch server to poll the federated search system server for information about changed objects of interest; the job server implements scheduling functions of this type. The job server may be programmed to execute processes that make single requests to the dispatch server, wait for completion and process results. In some embodiments, each dispatch server is programmed to execute a background process that wakes up periodically to poll the federated search system servers for changes.

In an embodiment, in some situations, the nexus server 614 may load on-the-fly to dispatch server 612, 613 an object representing a hit or search result from the nexus server and comprising old or out-of-date data of the kind described in a prior section of this disclosure. Such a hit or search result should be omitted from a feed for the same reasons previously set forth with respect to old data in a single federated search system, because the data that has been loaded on-the-fly is not new to the peered system. Therefore, in an embodiment, as shown at step 726, in response to importing a peered result object, a vector clock of the result object is tested. The vector clock identifies all systems that have edited the object. If the object has been edited only in one of the federated search system servers, and not on a nexus server, then in response, the Last_processed table 617 is updated but the object is not submitted to Percolate. In contrast, if any vector clock entry identifies another nexus, then the object is submitted to Percolate.

3.2.5 Shared Feed Facility

In an embodiment, a shared feed facility enables multiple different user accounts to receive results of a feed of updated search results. This facility provides consistent shared feeds to different user accounts who are in collaborating groups but have different permissions. Authorization settings for feeds enforce groups and classification markings to ensure that feed results are accessible only when permission to read a document succeeds.

In an embodiment, feeds containing alerts or notifications for matched queries may be shared among a plurality of user accounts in two ways. A first method is associated with a first user account sending or sharing metadata relating to a feed to or with a second user account. In an embodiment, the first user account may initiate a "send a feed" operation, which transmits a message to the second user account containing a link. In response to the second user account selecting the link, in response, a presentation layer server is programmed to open a dialog associated with creating a new feed that is pre-populated with values from the feed of the first user account. The second user account may accept or edit these values and save them as metadata for a new feed. The new feed is associated only with the second user account.

Figure 8:
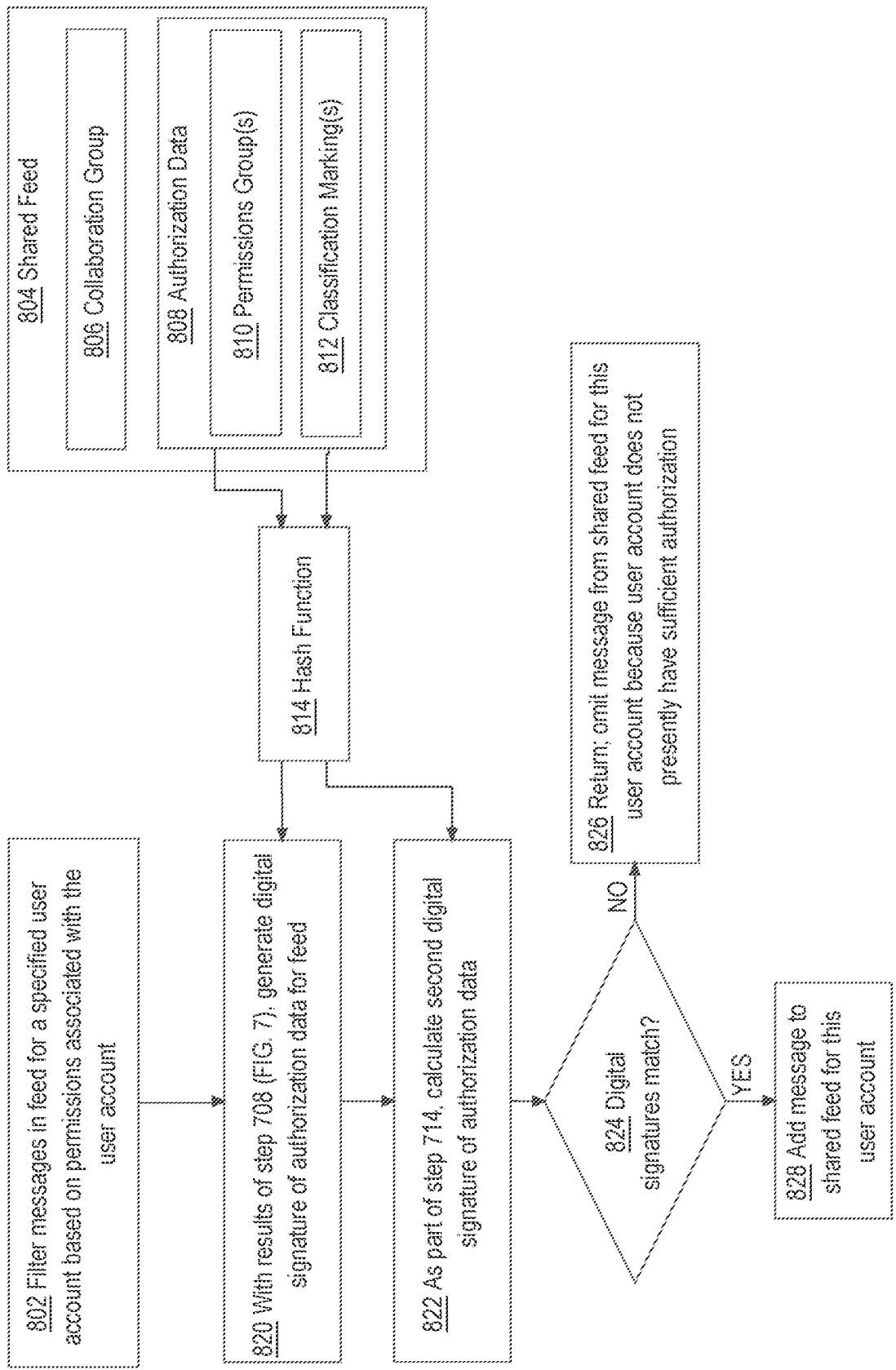
FIG. 8 is a flow diagram illustrating a method of shared feed control.

FIG. 8 is a flow diagram illustrating a method of shared feed control. In this second method for processing shared feeds, views of the state of the same feed are provided across multiple user accounts; each user account receives a view of the feed that is consistent, with respect to "read" state, for that specific user account regardless of whether other user accounts have read the objects or documents shown in the feed. This facility may be useful, for example, for teams of workers in which individual workers work different, staggered shifts but are subject to policy requiring each shift to examine each object or document that matches a particular registered query, independent of the other workers.

To implement this operation, a single feed is delivered to different user accounts but filtered according to the permissions associated with each user account. As shown at step 802, messages in a feed for a specified user account are filtered based on permissions associated with that user account. Thus, different user accounts having different permissions that receive the same shared feed may receive a different view of the feed, with some objects or documents included or omitted, depending on the permissions of each account. The permissions approach of section 2 of this document may be used to compare the permissions associated with a particular message, or the object or document which it references, to the permissions of a particular user account. If the rules specified in section 2 are satisfied with respect to permissions groups and classification markings for the message or underlying object or document, then the message is included in the feed for the specified user account. Furthermore, a different "read" flag values is maintained for each object for each user account associated with the feed. The approach herein recognizes that user accounts associated with a feed can change over time and permissions can change over time. Therefore, in an embodiment, dispatch servers 612, 613 are programmed to filter feeds to individual user accounts 620, 622 based upon permissions as described in section 2 and FIG. 8. Permissions data for user accounts 620, 622, messages or underlying objects or documents may be stored in database 604.

In an embodiment, each shared feed 804 (FIG. 8) is defined by stored metadata that specifies a collaboration group 806 that comprises a set of user account identifiers. Furthermore, authorization data 808 for a shared feed 804 is defined in data as a set of permissions groups 810 and a set of classification markings 812. Feed processing logic of dispatch servers 612, 613 is programmed to search for the authorization data 808 for a shared feed 804 before delivering the contents of the feed to a particular user account 620, 622. To see the objects and documents in a shared feed 804, a user account 620, 622 must be in the collaboration team 806 to which the feed is shared, and the user account must have access to all permissions groups 810 and markings 812 that are part of the authorization data based on the rules and logic described in section 2.

In addition, in response to detecting an object match for the feed, dispatch servers 612, 613 are programmed to create and store an authentication value comprising a hash over the authorization data for the shared feed at the time that the object matched. For example, as shown at step 820, in response to receiving results of matches after step 708 of FIG. 7, the dispatch servers 612, 613 are programmed to generate authentication data such as a first digital signature over authorization data 808 for a shared feed 804. A one-way hash function 814 implemented in program instructions, such as SHA-256, may be used.

In some embodiments, creating or editing a feed 804 to add a query causes indexing the query in the query indexing system 802 using the current permissions of the user account 620, 622. In some embodiments, the current permissions of a collaboration group 806 may be used, rather than permissions for an individual user account 620, 622. The latter approach has the benefit that creating a new access control identifier for a particular user account does not require reindexing all queries of the specific user account; only a change in group membership would require reindexing.

Thereafter, as seen at step 822, when a feed is delivered to a user account, for example at step 714, a second digital signature is recalculated using the then-current value of the authorization data; the same hash function 814 may be used. If the second digital signature generated at step 822 does not match the one that was created at the time of an object match at step 820, as tested at step 824, then the object is omitted from the feed for a particular user account, as seen at step 826. If the digital signatures match, then a message relating to the object is added to the shared feed as viewed by or delivered to the user account.

The test of step 824 may be supported by retrieving the current permissions with which a user account 620, 622 is indexed from a stored table in database 604 that maps user account identifiers to authentication data or digital signature values such as hash values.

This approach enables the dispatch servers 612, 613 to omit objects when the authorization data was edited after an object match occurred until just before presentation of feed results to a user account 620, 622. Furthermore, this approach permits adding user accounts 620, 622 to a shared feed that have a lower authorization level than others in the collaboration group 806, while keeping those lower-authorization user accounts from seeing a history of objects that they do not have permission to view at present.

In some embodiments, the foregoing approach is implemented with respect to messages in the feed that announce the existence of objects or documents that match registered queries. However, viewing properties, attributes or other aspects of the substantive content of an object or document may be governed by a separate permissions model. In some embodiments, the messages are programmed to be displayed when the user account associated with the feed presently has permissions that satisfy required permissions of the message at the time the message was entered in the feed.

This approach executes correctly regardless of whether or when changes occur in user accounts, permissions of user accounts, permissions of objects or messages. Furthermore, collaboration groups may be modified to add user accounts with a lower level of permissions than other user accounts already in the collaboration group, causing existing user accounts to remain able to access and view objects that they previously could, while ensuring that newly added user accounts only have access to objects for which those user accounts satisfy any required permissions.

In an embodiment, shared "read" state values are maintained for each message, object or document in a shared feed. In some embodiments, the identification of user accounts that have read a particular object or document may be reported or exposed.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
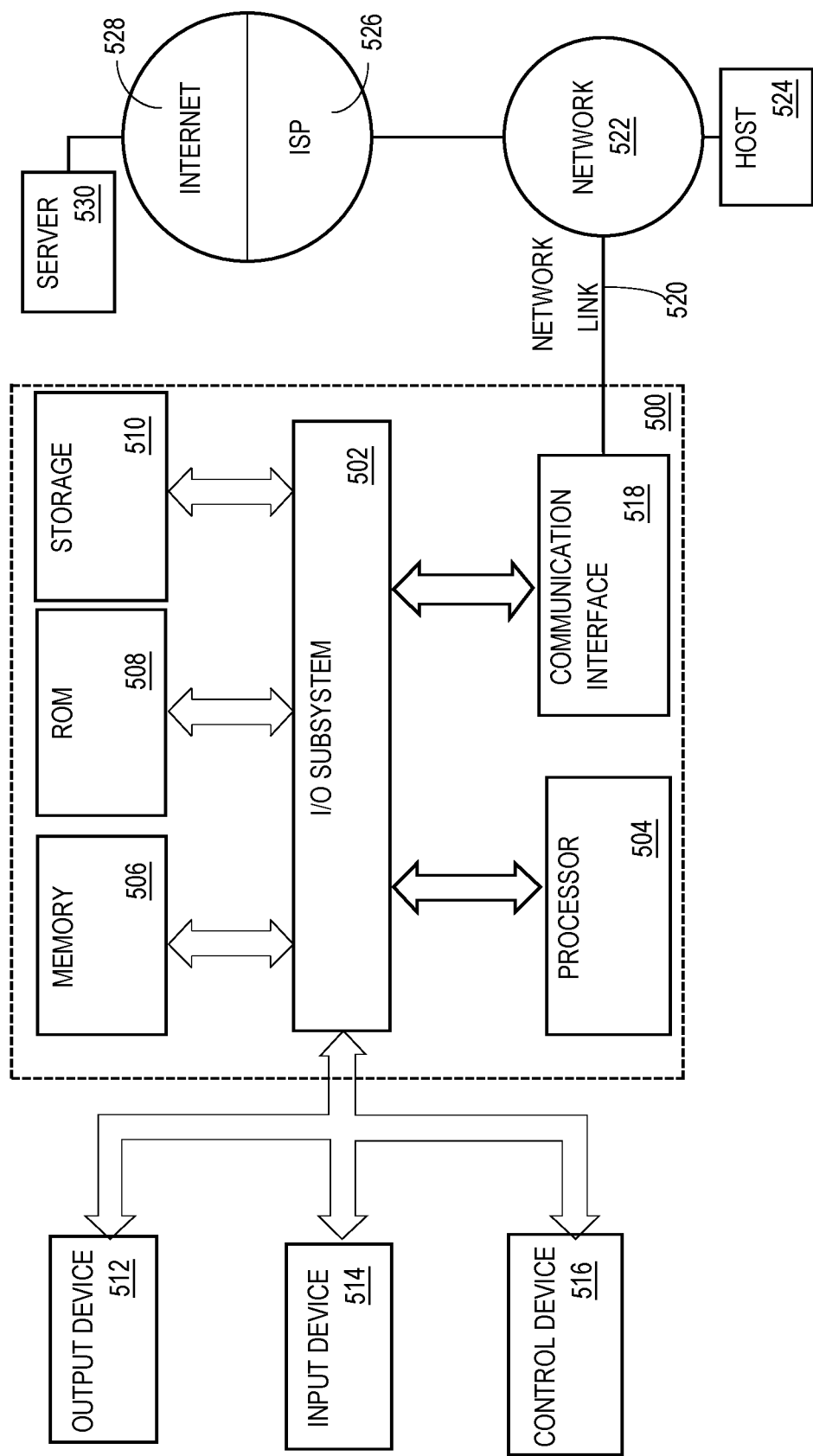
FIG. 5 illustrates an example computer system with which an embodiment may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The disclosure further encompasses the embodiments of the following numbered clauses:

21. A data processing system as recited elsewhere in the disclosure, further comprising sequences of instructions which when executed cause the one or more processors to perform: creating and storing a read flag table for the user account, the read flag table comprising a mapping of a plurality of read flag values to the plurality of electronic documents; updating the feed associated with the user account to show messages referring to the first versions of the electronic documents only when the read flag table for the user account specifies that the electronic documents are not yet read by the user account.

22. The data processing system of clause 21, the read flag values being clear when the associated electronic documents are unread by the user account and being set when the associated electronic documents are read by the user account.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
  receiving a plurality of identifiers of first versions of electronic documents that have been stored in a distributed data storage system and queuing the identifiers in a queue table of a database;
  obtaining, from the queue table, a set of the identifiers of the first versions of the electronic documents;
  invoking, using the set of the identifiers, a query indexing function of a search engine system and receiving a set of matching identifiers of electronic documents, from among the set of identifiers, that match queries that have been registered using the query indexing function;
  storing the matching identifiers in a last-processed table;
  processing second versions of the electronic documents associated with the matching identifiers that include changes to the first versions, using the query indexing function;
  updating a feed associated with a user account to show messages referring to the first versions of the electronic documents in response to determining that the second versions of the electronic documents do not match the queries;
  wherein the method is performed using one or more computing devices.

2. The method of claim 1, further comprising:
  obtaining, from the queue table, a second set of identifiers of electronic documents;
  determining that the second set of identifiers of electronic documents are for electronic documents originating from federated search services, and in response thereto:
  for the second set of identifiers, performing the invoking and storing steps;
  updating the feed associated with the user account to show messages referring to the second set of identifiers of electronic documents without performing the processing step.

3. The method of claim 1, further comprising updating the feed associated with the user account to show messages referring to the first versions of the electronic documents only in response to determining that the user account is associated with user account permissions that satisfy object permissions that are associated with the first versions of the electronic documents.

4. The method of claim 3, wherein determining that the user account is associated with user account permissions that satisfy object permissions that are associated with the first versions of the electronic documents comprises:

creating and storing a plurality of different access group identifiers each associated with one or more user account identifiers, and a plurality of different classification markings each representing a different access restriction for an electronic document, and associating each of the user account identifiers with one or more of the classification markings;

indexing each particular electronic document among the plurality of different electronic documents in association with values of one or more of the access group identifiers and with an inverse list of values of the classification markings that apply to the particular electronic document in a classification index;

for the set of matching identifiers of electronic documents, obtaining at least a first classification marking, among the plurality of classification markings, which is associated with the user account identifier;

storing, in the last-processed table, matching identifiers for only electronic documents having inverse lists that do not include the first classification marking.

5. The method of claim 4, further comprising storing, in the last-processed table, a matching identifier for a particular electronic document only when a particular user account identifier of the user account is associated with at least one access group identifier that is associated with that particular electronic document.

6. The method of claim 4, a particular electronic document having a first classification marking, and the inverse list comprising a set of all values of the one or more classification markings other than the first classification markings.

7. The method of claim 5, further comprising calculating an intersection of the first classification marking and the inverse lists of the electronic documents associated with the matching identifiers.

8. The method of claim 1 wherein each electronic document comprises a different property of a programmatic object having a plurality of properties.

9. The method of claim 1, further comprising:

creating and storing a set of shared feed authorization data that identifies one or more permissions groups and one or more classification markings;

in response to receiving the set of matching identifiers of electronic documents, from among the set of identifiers, that matched queries that have been registered using the query indexing function, calculating a first digital signature of the shared feed authorization data;

before updating the feed associated with the user account to show messages referring to the first versions of the electronic documents, calculating a second digital signature of the shared feed authorization data;

updating the feed associated with the user account to show messages referring to the first versions of the electronic documents only when the second digital signature matches the first digital signature.

10. The method of claim 9, further comprising:

creating and storing a read flag table for the user account, the read flag table comprising a mapping of a plurality of read flag values to the plurality of electronic documents;

updating the feed associated with the user account to show messages referring to the first versions of the electronic documents only when the read flag table for the user account specifies that the electronic documents are not yet read by the user account.

11. The method of claim 10, the read flag values being clear when the associated electronic documents are unread by the user account and being set when the associated electronic documents are read by the user account.

12. A data processing system comprising:

one or more processors;

one or more non-transitory computer-readable storage media coupled to the one or more processors and storing one or more sequences of instructions which when executed using the one or more processors cause the one or more processors to perform:

receiving a plurality of identifiers of first versions of electronic documents that have been stored in a distributed data storage system and queuing the identifiers in a queue table of a database;

obtaining, from the queue table, a set of the identifiers of the first versions of the electronic documents;

invoking, using the set of the identifiers, a query indexing function of a search engine system and receiving a set of matching identifiers of electronic documents, from among the set of identifiers, that match queries that have been registered using the query indexing function;

storing the matching identifiers in a last-processed table;

processing second versions of the electronic documents associated with the matching identifiers that include changes to the first versions, using the query indexing function;

updating a feed associated with a user account to show messages referring to the first versions of the electronic documents in response to determining that the second versions of the electronic documents do not match the queries.

13. The data processing system of claim 12, further comprising sequences of instructions which when executed cause the one or more processors to perform:

obtaining, from the queue table, a second set of identifiers of electronic documents;

determining that the second set of identifiers of electronic documents are for electronic documents originating from federated search services, and in response thereto:

for the second set of identifiers, performing the invoking and storing steps;

updating the feed associated with the user account to show messages referring to the second set of identifiers of electronic documents without performing the processing step.

14. The data processing system of claim 12, further comprising sequences of instructions which when executed cause the one or more processors to perform updating the feed associated with the user account to show messages referring to the first versions of the electronic documents only in response to determining that the user account is associated with user account permissions that satisfy object permissions that are associated with the first versions of the electronic documents.

15. The data processing system of claim 14, wherein the sequences of instructions which when executed cause determining that the user account is associated with user account permissions that satisfy object permissions that are associated with the first versions of the electronic documents further comprise sequences of instructions which when executed cause the one or more processors to perform:

creating and storing a plurality of different access group identifiers each associated with one or more user account identifiers, and a plurality of different classification markings each representing a different access restriction for an electronic document, and associating each of the user account identifiers with one or more of the classification markings;

indexing each particular electronic document among the plurality of different electronic documents in association with values of one or more of the access group identifiers and with an inverse list of values of the classification markings that apply to the particular electronic document in a classification index;

for the set of matching identifiers of electronic documents, obtaining at least a first classification marking, among the plurality of classification markings, which is associated with the user account identifier;

storing, in the last-processed table, matching identifiers for only electronic documents having inverse lists that do not include the first classification marking.

16. The data processing system of claim 15, further comprising sequences of instructions which when executed cause the one or more processors to perform storing, in the last-processed table, a matching identifier for a particular electronic document only when a particular user account identifier of the user account is associated with at least one access group identifier that is associated with that particular electronic document.

17. The data processing system of claim 15, a particular electronic document having a first classification marking, and the inverse list comprising a set of all values of the one or more classification markings other than the first classification markings.

18. The data processing system of claim 16, further comprising sequences of instructions which when executed cause the one or more processors to perform calculating an intersection of the first classification marking and the inverse lists of the electronic documents associated with the matching identifiers.

19. The data processing system of claim 12 wherein each electronic document comprises a different property of a programmatic object having a plurality of properties.

20. The data processing system of claim 12, further comprising sequences of instructions which when executed cause the one or more processors to perform:

creating and storing a set of shared feed authorization data that identifies one or more permissions groups and one or more classification markings;

in response to receiving the set of matching identifiers of electronic documents, from among the set of identifiers, that matched queries that have been registered using the query indexing function, calculating a first digital signature of the shared feed authorization data;

before updating the feed associated with the user account to show messages referring to the first versions of the electronic documents, calculating a second digital signature of the shared feed authorization data;

updating the feed associated with the user account to show messages referring to the first versions of the electronic documents only when the second digital signature matches the first digital signature.

\* \* \* \* \*